United States Patent
Pieper et al.

(10) Patent No.: US 9,508,318 B2
(45) Date of Patent: Nov. 29, 2016

(54) DYNAMIC COLOR PROFILE MANAGEMENT FOR ELECTRONIC DEVICES

(71) Applicant: NVIDIA Corporation, Santa Clara, CA (US)

(72) Inventors: Sean Midthun Pieper, Mountain View, CA (US); Kurt Roland Wall, Morgan Hill, CA (US); Ricardo J. Motta, Palo Alto, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 129 days.

(21) Appl. No.: 13/732,246

(22) Filed: Dec. 31, 2012

(65) Prior Publication Data
US 2014/0071102 A1    Mar. 13, 2014

Related U.S. Application Data

(60) Provisional application No. 61/700,824, filed on Sep. 13, 2012.

(51) Int. Cl.
| | |
|---|---|
| *G06F 3/038* | (2013.01) |
| *G09G 5/00* | (2006.01) |
| *G09G 5/02* | (2006.01) |
| *H04N 5/58* | (2006.01) |
| *H04N 9/73* | (2006.01) |
| *H04N 21/422* | (2011.01) |
| *H04N 21/431* | (2011.01) |

(52) U.S. Cl.
CPC ............... *G09G 5/026* (2013.01); *G09G 5/02* (2013.01); *H04N 5/58* (2013.01); *H04N 9/73* (2013.01); *H04N 21/42202* (2013.01); *H04N 21/4318* (2013.01); *G09G 2340/06* (2013.01); *G09G 2360/144* (2013.01)

(58) Field of Classification Search
None
See application file for complete search history.

(56) References Cited

U.S. PATENT DOCUMENTS

| | | |
|---|---|---|
| 3,904,818 A | 9/1975 | Kovac |
| 4,253,120 A | 2/1981 | Levine |
| 4,646,251 A | 2/1987 | Hayes et al. |
| 4,739,495 A | 4/1988 | Levine |
| 4,771,470 A | 9/1988 | Geiser et al. |
| 4,920,428 A | 4/1990 | Lin et al. |
| 4,987,496 A | 1/1991 | Greivenkamp, Jr. |
| 5,175,430 A | 12/1992 | Enke et al. |

(Continued)

FOREIGN PATENT DOCUMENTS

| | | |
|---|---|---|
| CN | 1275870 | 12/2000 |
| EP | 0392565 | 10/1990 |

(Continued)

OTHER PUBLICATIONS

Bolz, P. Schroder; "rapid evaluation of catmull-clark subdivision surfaces"; Web 3D '02.

(Continued)

*Primary Examiner* — Nicholas Lee

(57) ABSTRACT

Dynamic white point management techniques include determining a white point of ambient light proximate to a display. A color profile adjustment is determined based upon the determined white point and intensity of the ambient light. The image color space is transformed to a display color space for rendering on the display based on the determined adjusted to the color profile.

18 Claims, 2 Drawing Sheets

(56) References Cited

U.S. PATENT DOCUMENTS

| | | |
|---|---|---|
| 5,261,029 A | 11/1993 | Abi-Ezzi et al. |
| 5,305,994 A | 4/1994 | Matsui et al. |
| 5,387,983 A | 2/1995 | Sugiura et al. |
| 5,475,430 A | 12/1995 | Hamada et al. |
| 5,513,016 A | 4/1996 | Inoue |
| 5,608,824 A | 3/1997 | Shimizu et al. |
| 5,652,621 A | 7/1997 | Adams, Jr. et al. |
| 5,793,433 A | 8/1998 | Kim et al. |
| 5,878,174 A | 3/1999 | Stewart et al. |
| 5,903,273 A | 5/1999 | Mochizuki et al. |
| 5,905,530 A | 5/1999 | Yokota et al. |
| 5,995,109 A | 11/1999 | Goel et al. |
| 6,016,474 A | 1/2000 | Kim et al. |
| 6,078,331 A | 6/2000 | Pulli et al. |
| 6,111,988 A | 8/2000 | Horowitz et al. |
| 6,118,547 A | 9/2000 | Tanioka |
| 6,141,740 A | 10/2000 | Mahalingaiah et al. |
| 6,151,457 A | 11/2000 | Kawamoto |
| 6,175,430 B1 | 1/2001 | Ito |
| 6,252,611 B1 | 6/2001 | Kondo |
| 6,256,038 B1 | 7/2001 | Krishnamurthy |
| 6,281,931 B1 | 8/2001 | Tsao et al. |
| 6,289,103 B1 | 9/2001 | Sako et al. |
| 6,314,493 B1 | 11/2001 | Luick |
| 6,319,682 B1 | 11/2001 | Hochman |
| 6,323,934 B1 | 11/2001 | Enomoto |
| 6,392,216 B1 | 5/2002 | Peng-Tan |
| 6,396,397 B1 | 5/2002 | Bos et al. |
| 6,438,664 B1 | 8/2002 | McGrath et al. |
| 6,486,971 B1 | 11/2002 | Kawamoto |
| 6,584,202 B1 | 6/2003 | Montag et al. |
| 6,683,643 B1 | 1/2004 | Takayama et al. |
| 6,707,452 B1 | 3/2004 | Veach |
| 6,724,423 B1 | 4/2004 | Sudo |
| 6,724,932 B1 | 4/2004 | Ito |
| 6,737,625 B2 | 5/2004 | Baharav et al. |
| 6,760,080 B1 | 7/2004 | Moddel et al. |
| 6,785,814 B1 | 8/2004 | Usami et al. |
| 6,806,452 B2 | 10/2004 | Bos et al. |
| 6,839,062 B2 | 1/2005 | Aronson et al. |
| 6,856,441 B2 | 2/2005 | Zhang et al. |
| 6,891,543 B2 | 5/2005 | Wyatt |
| 6,900,836 B2 | 5/2005 | Hamilton, Jr. |
| 6,950,099 B2 | 9/2005 | Stollnitz et al. |
| 7,009,639 B1 | 3/2006 | Une et al. |
| 7,015,909 B1 | 3/2006 | Morgan III et al. |
| 7,023,479 B2 | 4/2006 | Hiramatsu et al. |
| 7,088,388 B2 | 8/2006 | MacLean et al. |
| 7,092,018 B1 | 8/2006 | Watanabe |
| 7,106,368 B2 | 9/2006 | Daiku et al. |
| 7,133,041 B2 | 11/2006 | Kaufman et al. |
| 7,133,072 B2 | 11/2006 | Harada |
| 7,221,779 B2 | 5/2007 | Kawakami et al. |
| 7,227,586 B2 | 6/2007 | Finlayson et al. |
| 7,245,319 B1 | 7/2007 | Enomoto |
| 7,305,148 B2 | 12/2007 | Spampinato et al. |
| 7,343,040 B2 | 3/2008 | Chanas et al. |
| 7,486,844 B2 | 2/2009 | Chang et al. |
| 7,502,505 B2 | 3/2009 | Malvar et al. |
| 7,580,070 B2 | 8/2009 | Yanof et al. |
| 7,626,612 B2 | 12/2009 | John et al. |
| 7,627,193 B2 | 12/2009 | Alon et al. |
| 7,671,910 B2 | 3/2010 | Lee |
| 7,728,880 B2 | 6/2010 | Hung et al. |
| 7,750,956 B2 | 7/2010 | Wloka |
| 7,817,187 B2 | 10/2010 | Silsby et al. |
| 7,859,568 B2 | 12/2010 | Shimano et al. |
| 7,860,382 B2 | 12/2010 | Grip |
| 8,238,695 B1 | 8/2012 | Davey et al. |
| 2001/0001234 A1 | 5/2001 | Addy et al. |
| 2001/0012113 A1 | 8/2001 | Yoshizawa et al. |
| 2001/0012127 A1 | 8/2001 | Fukuda et al. |
| 2001/0015821 A1 | 8/2001 | Namizuka et al. |
| 2001/0019429 A1 | 9/2001 | Oteki et al. |
| 2001/0021278 A1 | 9/2001 | Fukuda et al. |
| 2001/0033410 A1 | 10/2001 | Helsel et al. |
| 2001/0050778 A1 | 12/2001 | Fukuda et al. |
| 2001/0054126 A1 | 12/2001 | Fukuda et al. |
| 2002/0012131 A1 | 1/2002 | Oteki et al. |
| 2002/0015111 A1 | 2/2002 | Harada |
| 2002/0018244 A1 | 2/2002 | Namizuka et al. |
| 2002/0027670 A1 | 3/2002 | Takahashi et al. |
| 2002/0033887 A1 | 3/2002 | Hieda et al. |
| 2002/0041383 A1 | 4/2002 | Lewis, Jr. et al. |
| 2002/0044778 A1 | 4/2002 | Suzuki |
| 2002/0054374 A1 | 5/2002 | Inoue et al. |
| 2002/0063802 A1 | 5/2002 | Gullichsen et al. |
| 2002/0105579 A1 | 8/2002 | Levine et al. |
| 2002/0126210 A1 | 9/2002 | Shinohara et al. |
| 2002/0146136 A1 | 10/2002 | Carter, Jr. |
| 2002/0149683 A1 | 10/2002 | Post |
| 2002/0158971 A1 | 10/2002 | Daiku et al. |
| 2002/0167202 A1 | 11/2002 | Pfalzgraf |
| 2002/0167602 A1 | 11/2002 | Nguyen |
| 2002/0191694 A1 | 12/2002 | Ohyama et al. |
| 2002/0196470 A1 | 12/2002 | Kawamoto et al. |
| 2003/0035100 A1 | 2/2003 | Dimsdale et al. |
| 2003/0067461 A1 | 4/2003 | Fletcher et al. |
| 2003/0122825 A1 | 7/2003 | Kawamoto |
| 2003/0142222 A1 | 7/2003 | Hordley |
| 2003/0146975 A1 | 8/2003 | Joung et al. |
| 2003/0169353 A1 | 9/2003 | Keshet et al. |
| 2003/0169918 A1 | 9/2003 | Sogawa |
| 2003/0197701 A1 | 10/2003 | Teodosiadis et al. |
| 2003/0218672 A1 | 11/2003 | Zhang et al. |
| 2003/0222995 A1 | 12/2003 | Kaplinsky et al. |
| 2003/0223007 A1 | 12/2003 | Takane |
| 2004/0001061 A1 | 1/2004 | Stollnitz et al. |
| 2004/0001234 A1 | 1/2004 | Curry et al. |
| 2004/0032516 A1 | 2/2004 | Kakarala |
| 2004/0066970 A1 | 4/2004 | Matsugu |
| 2004/0100588 A1 | 5/2004 | Hartson et al. |
| 2004/0101313 A1 | 5/2004 | Akiyama |
| 2004/0109069 A1 | 6/2004 | Kaplinsky et al. |
| 2004/0178974 A1* | 9/2004 | Miller et al. .................. 345/82 |
| 2004/0189875 A1 | 9/2004 | Zhai et al. |
| 2004/0218071 A1 | 11/2004 | Chauville et al. |
| 2004/0247196 A1 | 12/2004 | Chanas et al. |
| 2005/0007378 A1 | 1/2005 | Grove |
| 2005/0007477 A1 | 1/2005 | Ahiska |
| 2005/0030395 A1 | 2/2005 | Hattori |
| 2005/0046704 A1 | 3/2005 | Kinoshita |
| 2005/0099418 A1 | 5/2005 | Cabral et al. |
| 2005/0175257 A1 | 8/2005 | Kuroki |
| 2005/0185058 A1 | 8/2005 | Sablak |
| 2005/0213128 A1 | 9/2005 | Imai et al. |
| 2005/0238225 A1 | 10/2005 | Jo et al. |
| 2005/0243181 A1 | 11/2005 | Castello et al. |
| 2005/0248671 A1 | 11/2005 | Schweng |
| 2005/0261849 A1 | 11/2005 | Kochi et al. |
| 2005/0286097 A1 | 12/2005 | Hung et al. |
| 2006/0050158 A1 | 3/2006 | Irie |
| 2006/0061658 A1 | 3/2006 | Faulkner et al. |
| 2006/0087509 A1 | 4/2006 | Ebert et al. |
| 2006/0119710 A1 | 6/2006 | Ben-Ezra et al. |
| 2006/0133697 A1 | 6/2006 | Uvarov et al. |
| 2006/0176375 A1 | 8/2006 | Hwang et al. |
| 2006/0197664 A1 | 9/2006 | Zhang et al. |
| 2006/0268180 A1* | 11/2006 | Chou .......................... 348/673 |
| 2006/0274171 A1 | 12/2006 | Wang |
| 2006/0290794 A1 | 12/2006 | Bergman et al. |
| 2006/0293089 A1 | 12/2006 | Herberger et al. |
| 2007/0002165 A1 | 1/2007 | Parks |
| 2007/0091188 A1 | 4/2007 | Chen et al. |
| 2007/0139405 A1* | 6/2007 | Marcinkiewicz .............. 345/207 |
| 2007/0147706 A1 | 6/2007 | Sasaki et al. |
| 2007/0171288 A1 | 7/2007 | Inoue et al. |
| 2007/0236770 A1 | 10/2007 | Doherty et al. |
| 2007/0247532 A1 | 10/2007 | Sasaki |
| 2008/0030587 A1 | 2/2008 | Helbing |
| 2008/0062164 A1 | 3/2008 | Bassi et al. |
| 2008/0218599 A1 | 9/2008 | Klijn et al. |
| 2008/0231726 A1 | 9/2008 | John |
| 2008/0303918 A1* | 12/2008 | Keithley ...................... 348/223.1 |

(56) References Cited

U.S. PATENT DOCUMENTS

| | | |
|---|---|---|
| 2009/0002517 A1 | 1/2009 | Yokomitsu et al. |
| 2009/0010539 A1 | 1/2009 | Guarnera et al. |
| 2009/0116750 A1 | 5/2009 | Lee et al. |
| 2009/0160957 A1 | 6/2009 | Deng et al. |
| 2009/0257677 A1 | 10/2009 | Cabral et al. |
| 2009/0295941 A1 | 12/2009 | Nakajima et al. |
| 2010/0266201 A1 | 10/2010 | Cabral et al. |
| 2010/0309333 A1 | 12/2010 | Smith et al. |
| 2011/0074980 A1 | 3/2011 | Border et al. |
| 2011/0096190 A1 | 4/2011 | Silverstein et al. |
| 2011/0122273 A1 | 5/2011 | Kanemitsu et al. |
| 2012/0019569 A1* | 1/2012 | Byun ............................ 345/690 |
| 2012/0293472 A1* | 11/2012 | Wong et al. .................. 345/207 |
| 2013/0050165 A1* | 2/2013 | Northway et al. ............ 345/207 |
| 2013/0083216 A1 | 4/2013 | Jiang et al. |
| 2013/0212094 A1 | 8/2013 | Naguib et al. |
| 2013/0242133 A1 | 9/2013 | Li |
| 2014/0063300 A1 | 3/2014 | Lin et al. |
| 2014/0125836 A1 | 5/2014 | Pieper |
| 2015/0002692 A1 | 1/2015 | Cabral et al. |
| 2015/0002693 A1 | 1/2015 | Cabral et al. |
| 2015/0130967 A1 | 5/2015 | Pieper |
| 2016/0037044 A1 | 2/2016 | Motta et al. |

FOREIGN PATENT DOCUMENTS

| | | |
|---|---|---|
| EP | 1449169 | 5/2003 |
| EP | 1378790 | 7/2004 |
| EP | 1447977 | 8/2004 |
| EP | 1550980 | 7/2005 |
| GB | 2045026 | 10/1980 |
| GB | 2363018 | 5/2001 |
| JP | 61187467 | 8/1986 |
| JP | 62151978 | 7/1987 |
| JP | 37015631 | 1/1995 |
| JP | 8036640 | 2/1996 |
| JP | 38079622 | 3/1996 |
| JP | 2001052194 | 2/2001 |
| JP | 2002207242 | 7/2002 |
| JP | 2003085542 | 3/2003 |
| JP | 2004221838 | 8/2004 |
| JP | 2005094048 | 4/2005 |
| JP | 2005182785 | 7/2005 |
| JP | 2005520442 | 7/2005 |
| JP | 2006025005 | 1/2006 |
| JP | 2006086822 | 3/2006 |
| JP | 2006094494 | 4/2006 |
| JP | 2006121612 | 5/2006 |
| JP | 2006134157 | 5/2006 |
| JP | 2007019959 | 1/2007 |
| JP | 2007148500 | 6/2007 |
| JP | 2007233833 | 9/2007 |
| JP | 2007282158 | 10/2007 |
| JP | 2008085388 | 4/2008 |
| JP | 2008277926 | 11/2008 |
| JP | 2009021962 | 1/2009 |
| KR | 1020040043156 | 5/2004 |
| KR | 1020060068497 | 6/2006 |
| KR | 1020070004202 | 1/2007 |
| WO | 03043308 | 5/2003 |
| WO | 2004063989 | 7/2004 |
| WO | 2007056459 | 5/2007 |
| WO | 2007093864 | 8/2007 |

OTHER PUBLICATIONS

J. Stam; "Exact Evaluation of Catmull-clark subdivision surfaces at arbitrary parameter values"; Jul. 1998; Computer Graphics; vol. 32; pp. 395-404.

Keith R. Slavin; Application As Filed entitled "Efficient Method for Reducing Noise and Blur in a Composite Still Image From a Rolling Shutter Camera"; Application No. 12069669; Filed Feb. 11, 2008.

Ko et al., "Fast Digital Image Stabilizer Based on Gray-Coded Bit-Plane Matching", IEEE Transactions on Consumer Electronics, vol. 45, No. 3, pp. 598-603, Aug. 1999.

Ko, et al., "Digital Image Stabilizing Algorithms Basd on Bit-Plane Matching", IEEE Transactions on Consumer Electronics, vol. 44, No. 3, pp. 617-622, Aug. 1988.

Krus, M., Bourdot, P., Osorio, A., Guisnel, F., Thibault, G., Adaptive tessellation of connected primitives for interactive ovalkthroughs in complex industrial virtual environments, Jun. 1999, Proceedings of the Eurographics workshop, pp. 1-10.

Kumar, S., Manocha, D., Interactive display of large scale trimmed NURBS models, 1994, University of North Carolina at Chapel Hill, Technical Report, p. 1-36.

Kuno et al. "New Interpolation Method Using Discriminated Color Correlation for Digital Still Cameras" IEEE Transac. On Consumer Electronics, vol. 45, No. 1, Feb. 1999, pp. 259-267.

Loop, C., DeRose, T., Generalized B-Spline surfaces o arbitrary topology, Aug. 1990, SIGRAPH 90, pp. 347-356.

M. Halstead, M. Kass, T. DeRose; "efficient, fair interolation using catmull-clark surfaces"; Sep. 1993; Computer Graphics and Interactive Techniques, Proc; pp. 35-44.

Morimoto et al., "Fast Electronic Digital Image Stabilization for Off-Road Navigation", Computer Vision Laboratory, center for Automated Research University of Maryland, Real-Time Imaging, vol. 2, pp. 285-296, 1996.

Paik et al., "An Adaptive Motion Decision system for Digital Image Stabilizer Based on Edge Pattern Matching", IEEE Transactions on Consumer Electronics, vol. 38, No. 3, pp. 607-616, Aug. 1992.

Parhami, Computer Arithmetic, Oxford University Press, Jun. 2000, pp. 413-418.

S. Erturk, "Digital Image Stabilization with Sub-Image Phase Correlation Based Global Motion Estimation", IEEE Transactions on Consumer Electronics, vol. 49, No. 4, pp. 1320-1325, Nov. 2003.

S. Erturk, "Real-Time Digital Image Stabilization Using Kalman Filters", http://www,ideallibrary.com, Real-Time Imaging 8, pp. 317-328, 2002.

T. DeRose, M., Kass, T. Troung; "subdivision surfaces in character animation"; Jul. 1998; Computer Graphics and Interactive Techniques, Proc; pp. 85-94.

Takeuchi, S., Kanai, T., Suzuki, H., Shimada, K., Kimura, F., Subdivision surface fitting with QEM-basd mesh simplificatio and reconstruction of aproximated B-Spline surfaces, 200, Eighth Pacific Conference on computer graphics and applications pp. 202-2012.

Uomori et al., "Automatic Image Stabilizing System by Full-Digital Signal Processing", vol. 36, No. 3, pp. 510-519, Aug. 1990.

Uomori et al., "Electronic Image Stabiliztion System for Video Cameras and Vcrs", J. Soc. Motion Pict. Telev. Eng., vol. 101, pp. 66-75, 1992.

"A Pipelined Architecture for Real-Time orrection of Barrel Distortion in Wide-Angle Camera Images", Hau, T. Ngo, Student Member, IEEE and Vijayan K. Asari, Senior Member IEEE, IEEE Transaction on Circuits and Sytstems for Video Technology: vol. 15 No. 3 Mar. 2005 pp. 436-444.

"Calibration and removal of lateral chromatic abberation in images" Mallon, et al. Science Direct Copyright 2006; 11 pages.

"Method of Color Interpolation in a Singe Sensor Color Camera Using Green Channel Seperation" Weerasighe, et al Visual Information Processing Lab, Motorola Austrailian Research Center pgs. IV-3233-IV3236, 2002.

D. Doo, M. Sabin "Behaviour of recrusive division surfaces near extraordinary points"; Sep. 197; Computer Aided Design; vol. 10, pp. 356-360.

D.W.H. Doo; "A subdivision algorithm for smoothing down irregular shaped polyhedrons"; 1978; Interactive Techniques in Computer Aided Design; pp. 157-165.

Davis, J., Marschner, S., Garr, M., Levoy, M., Filling holes in complex surfaces using volumetric diffusion, Dec. 2001, Stanford University, pp. 1-9.

Donald D. Spencer, "Illustrated Computer Graphics Dictionary", 1993, Camelot Publishing Company, p. 272.

Duca et al., "A Relational Debugging Engine for Graphics Pipeline, International Conference on Computer Graphics and Interactive Techniques", ACM SIGGRAPH Jul. 2005, pp. 453-463.

(56) References Cited

OTHER PUBLICATIONS

E. Catmull, J. Clark, "recursively enerated B-Spline surfaces on arbitrary topological meshes"; Nov. 1978; Computer aided design; vol. 10; pp. 350-355.
gDEBugger, graphicRemedy, http://www.gremedy.com, Aug. 8, 2006, pp. 1-18 .
http://en.wikipedia.org/wiki/Bayer_filter; "Bayer Filter"; Wikipedia, the free encyclopedia; pp. 1-4.
http://en.wikipedia.org/wiki/Color_filter_array; "Color Filter Array"; Wikipedia, the free encyclopedia; pp. 1-5.
http://en.wikipedia.org/wiki/Color_space; "Color Space"; Wikipedia, the free encyclopedia; pp. 1-4.
http://en.wikipedia.org/wiki/Color_translation; "Color Management"; Wikipedia, the free encyclopedia; pp. 1-4.
http://en.wikipedia.org/wiki/Demosaicing; "Demosaicing"; Wikipedia, the free encyclopedia; pp. 1-5.
http://en.wikipedia.org/wiki/Half_tone; "Halftone"; Wikipedia, the free encyclopedia; pp. 1-5.
http://en.wikipedia.org/wiki/L*a*b*; "Lab Color Space"; Wikipedia, the free encyclopedia; pp. 1-4.
http://Slashdot.orgiarticles/07/09/0611431217.html.
http:englishrussia.com/?p=1377.

* cited by examiner

DYNAMIC COLOR PROFILE MANAGEMENT FOR ELECTRONIC DEVICES

CROSS-REFERENCE TO RELATED APPLICATIONS

This application claims the benefit of U.S. Provisional Patent Application No. 61/700,824 filed Sep. 13, 2012, which is incorporated herein by reference.

BACKGROUND OF THE INVENTION

Electronic devices have made significant contributions toward the advancement of modern society and are utilized in a number of applications to achieve advantageous results. Numerous devices, such as desktop personal computers (PCs), laptop PCs, tablet PCs, netbooks, smart phones, game consoles, servers, and the like have facilitated increased productivity and reduced costs in communicating and analyzing data in most areas of entertainment, education, business, and science. One common aspect of such electronic devices is the display. The display may be utilized to control the operation of the device, output content to the user, and the like.

The display, of a number electronic devices, may be subject to changing environments, particularly for mobile electronic devices such as tablet PCs, smart phones, personal game consoles, and the like. The changing environment commonly impacts the clarity of the display for the user. Accordingly, there is a continuing need for improved display technology.

SUMMARY OF THE INVENTION

The present technology may best be understood by referring to the following description and accompanying drawings that are used to illustrate embodiments of the present technology directed toward techniques for dynamically adjusting the color gamut subset of a display to match the current ambient light.

In one embodiment, the method of dynamically managing the white point (e.g., color profile) of a display includes determining a white point and intensity of ambient light proximate a display. A color profile adjustment of a display is determined based upon the determined white point and intensity of the ambient light. The image color space is transformed to a display color space based on the determined color profile adjustment of the display.

In another embodiment, an electronic device including one or more dynamic white point (e.g., color profile) managed displays includes one or more light sensors and one or more processing units. The one or more processing units determine a white point and intensity of the ambient light sensed by the light sensor. The one or more processing units also determine a color profile adjustment based upon the determined white point and intensity of the ambient light. The one or more processing units further transform an image color space to a display color space based on the determined color space adjusted and to present content in the display color space on the display.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
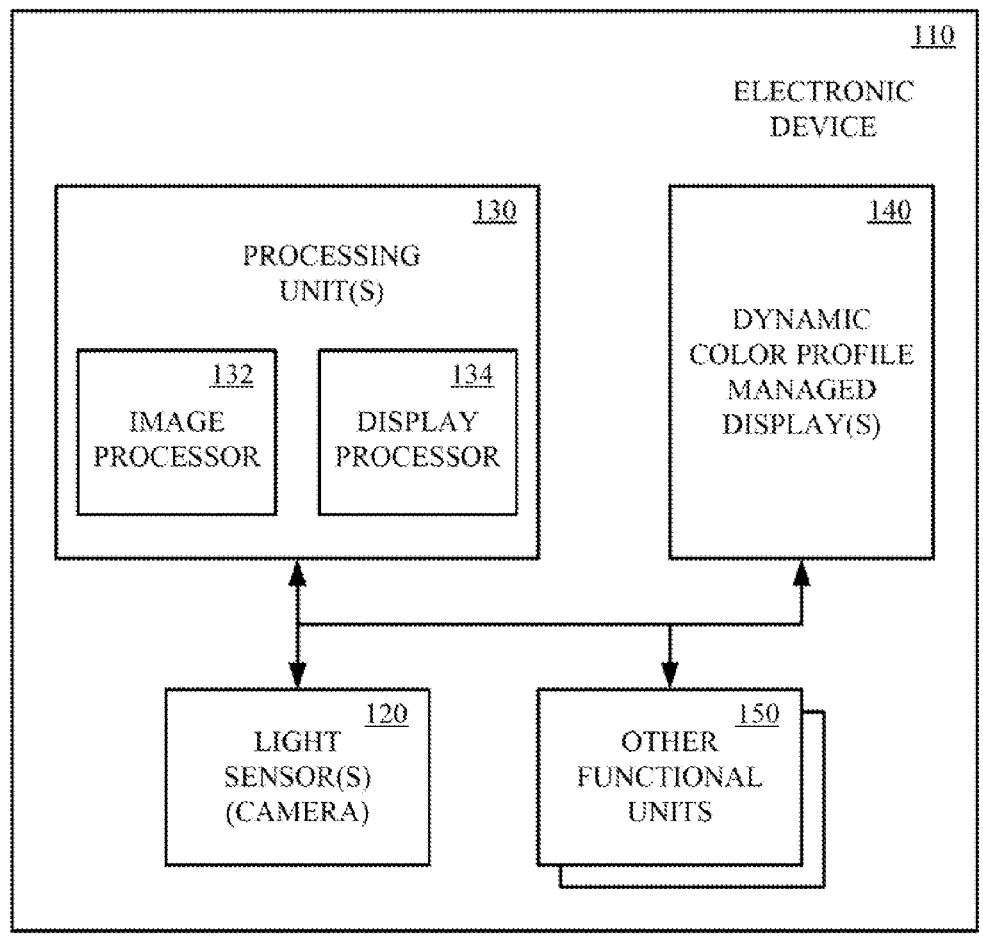
FIG. 1 shows a block diagram of an electronic device including one or more dynamic white point (e.g., color profile) managed displays, in accordance with one embodiment of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device, that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Displays typically have a larger possible color gamut than is used at any one time. The subset of the gamut that is active can be adjusted to remap input colors based on a color profile. In embodiments of the present technology, the color gamut subset used for rendering image on a display is dynamically adjusted so that the white point of the display matches the current ambient lighting in which the display is utilized.

Referring now to FIG. 1, an electronic device including one or more dynamic white point (e.g., color profile) managed displays, in accordance with one embodiment of the present technology, is shown. The electronic device 110 includes one or more light sensors 120, one or more processing units 130, one or more displays 140 and any number of other subsystems for implementing functionalities of the electronic device. For example, the electronic device may include one or more communication interfaces, a keyboard, speakers, a microphone and the like for implementing devices such as laptop PCs, tablet PCs, netbooks, smartphones and/or the like. However, these additional subsystems are not necessary to an understanding of embodiment of the present technology and therefore are not discussed further.

In one implementation, the light sensor may be one or more photo diodes, such as a red, a green and a blue wide angle photo diode. In another implementation, the light sensor may be a camera. In one implementation, the one or more processing units may include an image processor 132 and a display processor 134. The one or more processing units may also include a central processing unit, a graphics processing unit, application specific integrated circuit (ASIC), field programmable array (FPGA), combinational logic, and/or the like. The one or more processing units may be implemented in any combination of hardware, firmware and/or software. In one implementation, the display may be a basic display. In another implementation, the display may be as touch screen display.

Figure 2:
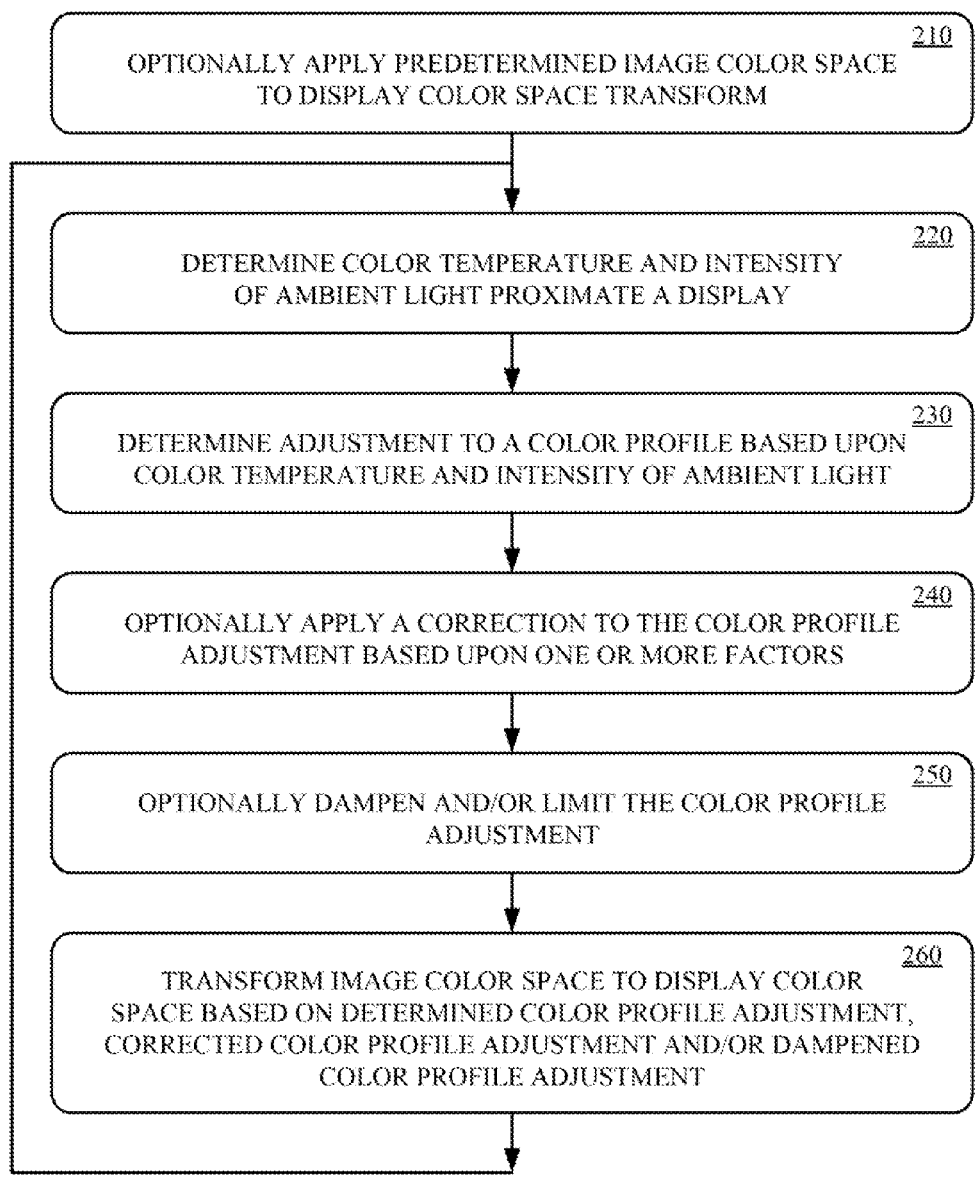
FIG. 2 shows a flow diagram of a method of dynamically managing the white point (e.g., color profile) of a display, in accordance with one embodiment of the present technology.

Operation of the electronic device will be further explained with reference to FIG. 2, which shows a method of dynamically managing the white point (e.g., color profile) of a display. The method may be implemented in hardware, firmware, as computing device-executable instructions (e.g., computer program) that are stored in computing device-readable media (e.g., computer memory) and executed by a computing device (e.g., processor) or any combination thereof.

The method may begin with determining a white point and optionally an intensity of an ambient light proximate a display, at 220. In one implementation, the white point is determined by estimating a set of tristimulas values (e.g., XYZ, sRGB) or chromaticity (e.g., xy, uv) for the color white of the ambient light. In another implementation, the white point is determined by estimating a set of chromaticity coordinates (e.g., YUV) for the color white of the ambient light In one implementation, the one or more light sensors in combination with the one or more processing units periodically determine the white point and intensity of the ambient light proximate the electronic device. In one implementation, a camera of the electronic device captures image frames and estimates the white chromaticity and intensity using auto exposure and auto white balance components of the image processing stack. In another implementation, a combinational logic circuit central processor or the like may determine the white point and intensity of the light captured by a set of wide angle photo diodes (e.g., red, green and blue).

At 230, an adjustment to a color profile of the display is determined based upon the determined white point and optionally the intensity of the ambient light proximate the display. In one implementation, a central processor, ASIC, display processor or the like may determine a gamut subset of the display that has a white point and optionally an intensity that substantially matches the determined white point and optionally the intensity of the ambient light. In one implementation, the adjustment may be determined from a data structure that correlates relative color response of the light sensor to chromaticity setting of the display. In another implementation, the adjustment may be determined on a per-unit basis from a data structure that correlates the relative color response of the particular light sensor to one or more know lights and the measured chromaticity at one or more settings of the particular display. The per-unit measurements of the sensor and display may be utilized to overcome manufacturing variations. In addition, both measurements may also be combined with general characteristics of the light sensor and/or display based on more extensive measurements than is appropriate for a manufacturing line.

At 240, a correction to the determined color profile adjustment may optionally be performed based on one or more factors. In one implementation, the selected subset of the display color space profile may be adjusted based on a bezel size of the display. In another implementation, the selected profile may be adjusted based on the relative and absolute brightness of the screen and/or the ambient light. In yet another implementation, the selected profile may be adjusted based on limits on the display gamut.

At 250, the color profile adjustment may optionally be dampened, limited or the like, at 260. In one implementation, the central processor, ASIC, display processor or the like may dampen or limit the rate of change in the color profile adjustment to provide a smooth change in display color, thus avoiding disruption to the user experience.

At 260, for an image presented on the display, the color space of the image is transformed to a color space of the display based on the determined color profile adjustment, the corrected color profile adjustment, the dampened color profile adjustment and/or limited color profile adjustment. In one implementation, the one or mere processing units transforms the color image space to the color display space based upon the determined color profile adjustment. In one implementation, the transform is determined from a color correction matrix, lookup table, or the like.

The processes of 220-260 may be iteratively repeated. The processes may be iteratively repeated periodically, when a change in the ambient light is detected, or the like.

A predetermined image color space to display color space transform may optionally be applied at one or more time, at 210. In one implementation, the processing unit may apply a default image color space to display color space transform before the processes of 220-260 are performed. In another implementation, the processing unit may apply a previously determined image color space to display color space transform. The choice of applying a default or previously determined image color space to display color space transform may be based upon a state of the device, timing information and or the like. For example, if the display is turned off and turned back on again within a few minutes, the odds are good that the last white point could be used again when the display it turned back on. In such an example, the previously determined image color space to display color space transform may be applied. In another example, the default image color space to display color space transform may be applied when the device has been turned back on after several days. In such case, the odds are good that the ambient light is completely changed and therefore the default image color space to display color space transform may be as good as any until processes 220-260, can be performed.

For electronic devices that already include a camera, a plurality of wide angle photo diodes, or other similar light sensor, dynamic white point adjustment in response to changes in the ambient light may advantageously be implemented without added costs to the bill of materials for the electronic device. The white point adjustment technique may be implemented transparently to the end user of the electronic device. Automatically adjusting the white point of the display according to the current ambient lighting can advantageously reduce eyestrain and provide a better viewing experience for the user. Furthermore, embodiments of the present technology may coexist with manual color profile adjustment, and may include optional controls such as enable-disable, manual white point selection, limits on adjustment range and speed, exposed to end users and/or application, and/or the like.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:
    periodically determining a white point of ambient light proximate a display;
    determining a color profile adjustment for the color space of the display based upon the determined current white point of the ambient light;
    dampening a current color profile adjustment based upon one or more previous determined color profile adjustments; and
    transforming an image color space to the display color space based on the dampened color profile adjustment of the display so that the white point of the display substantially matches the current white point of the ambient light proximate the display, wherein the color gamut of the display color space is greater than the color gamut of the image color space.

2. The method according to claim 1, wherein determining the white point of the ambient light comprises estimating a set of tristimulus values or chromaticity coordinates of a color white of the ambient light.

3. The method according to claim 1, where determining the color profile adjustment comprises substantially determining a gamut subset of the display having a white point that substantially matches the determined white point of the ambient light.

4. The method according to claim 1, wherein transforming the image color space to the display color space comprises transforming a white point of an encoded image to a rendered image substantially matching the white point of the ambient light.

5. The method according to claim 1, wherein determining the white point of the ambient light, determining the color profile adjustment, dampening the current color profile adjustment and transforming the image color space to the display color space is iteratively performed on a periodic basis.

6. The method according to claim 1, wherein determining the color profile adjustment, dampening the current color profile adjustment and transforming the image color space to the display color space is iteratively performed each time a change in the white point of the ambient light proximate to the display is determined.

7. The method according to claim 1, further comprising:
    applying a correction to the determined color profile adjustment based upon one or more parameters selected from a group consisting of a bezel size of the display, a relative brightness of the display, an absolute brightness of the display and a limit on the display gamut; and
    further transforming the image color space to the display color space based on the dampened corrected color profile adjustment.

8. The method according to claim 1, further comprising applying a predetermined image color space to display color space transform before the processes of determining the white point of the ambient light, determining the color profile adjustment, dampening the current color profile and transforming the image color space to the display color space is performed.

9. A computing device comprising:
    a means for determining a current white point of ambient light proximate to a display;
    a means for determining a color profile adjustment for the color space of the display based upon the determined white point of the ambient light; and
    a means for transforming an image color space to a display color space based on the determined color profile adjustment so that the white point of the display substantially matched the current white point of the ambient light proximate the display, wherein the color gamut of the display color space is greater than the color gamut of the image color space.

10. The computing device of claim 9, further comprising a means for applying a correction to the color profile adjustment based upon one or more parameters selected from a group consisting of a bezel size of the display, a relative brightness of the display, an absolute brightness of the display and a limit on the display gamut.

11. The computing device of claim 9, further comprising a means for applying a predetermined image color space to display color space transform before determining the white point of the ambient light, determining the color space adjustment and transforming the image color space to the display color space is performed.

12. The computing device of claim 9, further comprising a means for iteratively determining the white point of the ambient light, determining the color space adjustment and transforming the image color space to the display color space on a periodic basis.

13. The computing device of claim 9, further comprising a means for iteratively determining the color space adjustment and transforming the image color space to the display color space each time a change in the white point of the ambient light is determined.

14. A computing device comprising:
a display;
a light sensor to sense ambient light; and
a processing unit to determine a white point of the ambient light sensed by the light sensor, to determine a color profile adjustment for the color space of the display based upon the determined white point of the ambient light, to transform an image color space to a display color space based on the determined color space adjusted and to present content in the display color space on the display so that the white point of the display substantially matched the white point of the ambient light, wherein the color gamut of the display color space is greater than the color gamut of the image color space.

15. The computing device of claim 14, wherein the light sensor comprises a camera.

16. The computing device of claim 14, wherein the light sensor comprises a plurality of photo diodes.

17. The computing device of claim 14, wherein the light sensor senses the ambient light behind the display.

18. The computing device of claim 14, wherein the light sensor sense the ambient light in front of the display.

* * * * *